July 21, 1953 M. M. MITCHELL 2,646,017
SAFETY SPEED ALARM
Filed Dec. 4, 1951
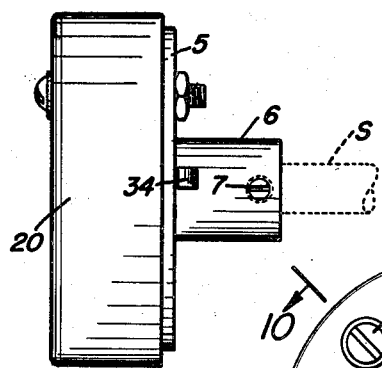
FIG. 1.
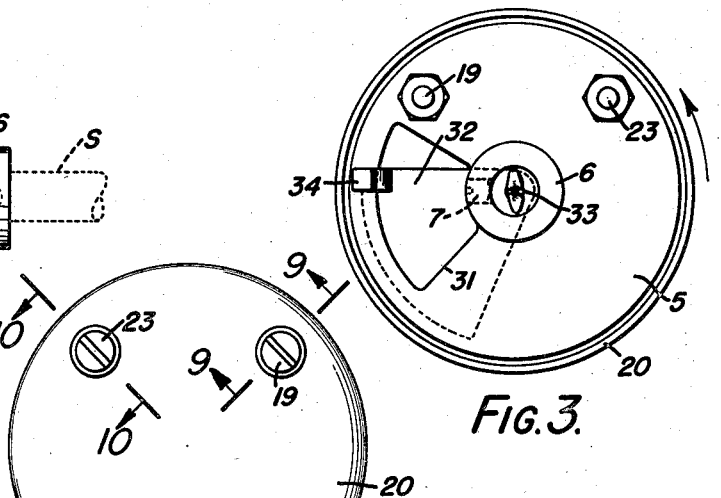
FIG. 2. FIG. 3.
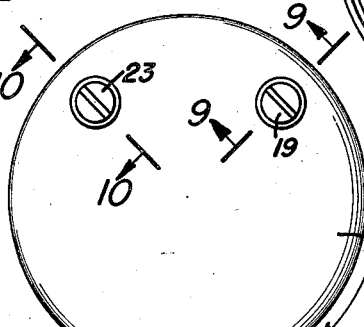
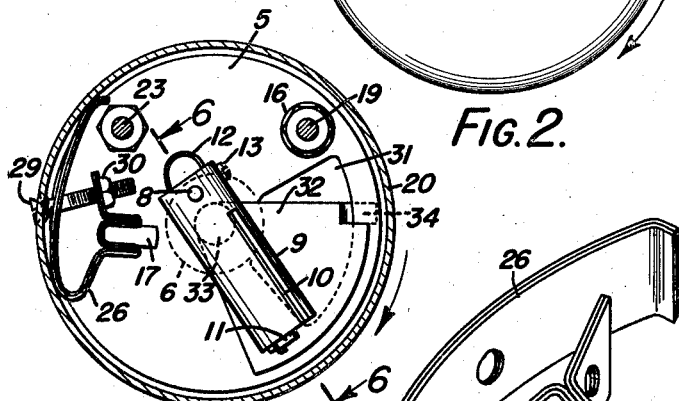
FIG. 4. FIG. 5.
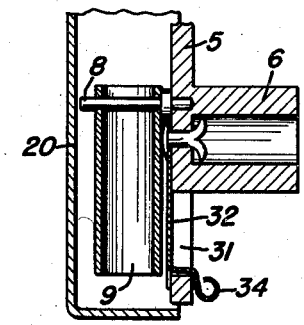
FIG. 6.
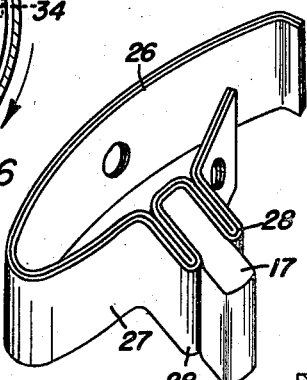
FIG. 10.
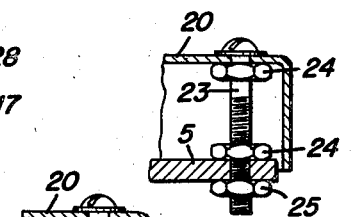
FIG. 9.
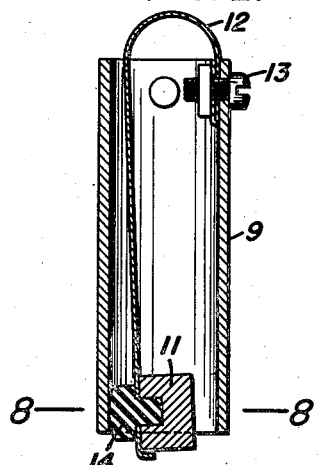
FIG. 7.
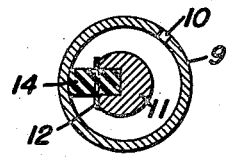
FIG. 8.
INVENTOR.
MERRITT M. MITCHELL
BY
D. Clyde Jones
ATTORNEY Patented July 21, 1953

2,646,017

UNITED STATES PATENT OFFICE 2,646,017

SAFETY SPEED ALARM

Merritt M. Mitchell, Rochester, N. Y.

Application December 4, 1951, Serial No. 262,381

4 Claims. (Cl. 116—74)

This invention relates to an alarm device which gives a signal when a horizontal shaft or spindle is rotating at a predetermined number of revolutions per minute.

In many situations in industry, it is important that a warning be given when a rotating horizontal shaft reaches a predetermined number of revolutions per minute.

Specifically, the present device, although not limited thereto, is especially adapted for use as a film feed reel alarm. It is customary to make a motion picture into several reels of film. In order that the projection of the picture from these reels may be uninterrupted, due to the change-over from one film reel to the next, it is common practice to use two projectors and to switch alternately from one projector to the other as one reel of film is emptied and a fresh reel of film is started.

To insure that the picture will be shown without any noticeable break or delay between the several reels, it is necessary for the operator to start the second projector equipped with the next reel of film, at the instant that the projection of the preceding reel of film is terminated in the first projector. This alternate use of two projectors is continued until the several reels comprising the entire motion picture, are displayed. It is, therefore, highly important that the operator be alerted to the need for switching from one projector to the other, a short time before this operation is to take place.

The main object of this invention is to provide an alarm rotated by a horizontal shaft and adapted to give a signal when the speed of the shaft accelerates to a predetermined number of revolutions per minute.

A further object of the invention is to provide an alarm which will signal the operator of a projector whenever a film reel is about to be exhausted of its film, so that he can switch the operation of the projectors alternately without any break in the projected picture.

The various features and advantages of the invention will appear from the detailed description and claims when taken with the drawings in which:

Fig. 1 is a side elevation of the present alarm;

Fig. 2 is a front elevation; and

Fig. 3 is a rear elevation of the alarm;

Fig. 4 is a view of the alarm with a part of its cover cut away to illustrate the several parts mounted therein;

Fig. 5 is a perspective view of the rebounding bumper and its mounting spring;

Fig. 6 is a sectional view taken substantially on the line 6—6 of Fig. 4;

Fig. 7 is an enlarged longitudinal sectional view particularly showing the mounting of the clapper of the bell;

Fig. 8 is a cross-sectional view through the bell taken on the line 8—8 of Fig. 7;

Fig. 9 is a fragmentary section taken on the line 9—9 of Fig. 2; and

Fig. 10 is a section taken on the line 10—10 of Fig. 2.

The alarm of the present invention comprises a circular frame plate 5 having an integral hollow hub 6 projecting at right angles from the center of one surface thereof. This hub is adapted to fit over and to be locked by a setscrew 7, on a horizontal shaft or spindle S, the critical speed of which is to be indicated. As herein disclosed the spindle S is the upper magazine spindle of any standard thirty-five millimeter motion picture projector. A stub shaft 8 extending parallel to spindle S, projects from the other surface of the frame plate. While the stub shaft can project from the center of the frame plate, it is preferred to have it project eccentrically from this plate, as illustrated, since the diameter of the device can thereby be reduced. This shaft pivotally supports one end of an elongated rotor or tubular bell 9 having a longitudinal slot 10 cut therein. The clapper 11 of the rotor is mounted on one side of the lower end of a leaf spring 12 which projects to the lower end of the rotor, the upper end of the spring being arched over the stub shaft 8 and being fastened to the inner surface of the rotor by a bolt and nut 13. It will be noted that the lower end of the spring 12 carries a rubber button 14 at a point opposite the clapper and is biased toward the left (Fig. 7). Thus this button normally engages the inner surface of the rotor while the clapper 11 is normally held out of engagement therewith.

As the frame plate 5 is rotated by the spindle S, the rotor 9 is carried around by the eccentrically mounted shaft 8. In the course of this rotation, the rotor swings between a fixed tubular bumper 16 and an adjustable bumper 17. These bumpers which project at right angles to the frame, into the path of the rotor 9, are made of resilient material such as natural or synthetic rubber or plastic pieces or metal springs. The type of bumper 17 to be used, whether in the form of a metal spring or in the form of plastic material or rubber, is governed by the environment and by the type of equipment on which the alarm is used. If the bumper 17 is exposed to an oily atmosphere, a metal spring is preferable. The bumper 16 surrounds the bolt 19 by which a cup-shaped cover 20 enclosing the bell 9 and the cooperating bumpers, is fastened to the frame. Nuts 21 threaded on the bolt 19 grip the ends of the bumper and snugly engage the surfaces of the cover and the frame plate respectively while the end nut 22 on bolt 19 holds the several assembled parts on the frame in the relation shown in Fig. 9. A second bolt 23 in cooperation with the bolt 19 holds the cover 20 and its rim spaced from but in overlapping relation with the edge of the frame plate 5. Spacing nuts 24 on the bolt 23 and the end nut 25 snugly engage the cover and the frame in the assembled relation shown in Fig. 10.

The annular side of the cup carries on its inner surface, an arcuate support 26 of strip metal, sharply bent back on itself, to provide a spring arm 27. This arm is provided with spaced fingers 28 to grip the rubber bumper 17 so that its free end projects toward the rotor 9. A bolt 29 extending through the annular side of the cup as well as through a hole in the strip and through a hole in the free end of the spring arm 27, is engaged by a nut 30. As this nut is screwed on to the bolt 29, the spring arm tends to move the free end of the bumper 17 away from the swinging rotor 9. When, however, the nut is loosened on the bolt, the spring arm tends to move the free end of the bumper 17 toward the swinging rotor. By this arrangement, the bumper 17 can be adjusted to various positions along the rotor 9 to determine what point thereon will hit the bumper, thereby changing the arc of travel of the rotor.

The frame plate has a sector-shaped opening 31 therein, through which the sound of the bell can issue. A sector-shaped closure 32 is pivoted at 33 on the frame, to be moved by the handle 34 across more or less of the opening 31 so that volume of the signal can be controlled at will.

In the operation of the alarm, the rotating spindle S of the upper magazine reel, rotates the alarm in a clockwise direction as illustrated in Fig. 4. It should be pointed out that the speed of the spindle S of a commercial motion picture projector ranges from approximately twenty-five revolutions per minute at the start of reels having four or five inch hubs, to sixty and seventy-two revolutions per minute respectively at the finish of the film on these reels. A reel with a two inch hub has a termination speed of one hundred-twenty revolutions per minute. The time of operation of the alarm is in the range from fifty revolutions per minute to one hundred-twenty revolutions per minute, depending on the diameter of the reel hub. The present alarm is adjustable to sound at the predetermined revolution per minute for which it is adjusted in the mentioned range. As the magazine spindle S rotates the alarm, the tubular bell or rotor 9 is free to swing about the shaft 8 between the tubular bumper 16 and the rebound bumper 17. The arc of the swing is of a length from seventy to one hundred twenty-five degrees depending on the adjustment of the rebound bumper 17 along the rotor. As the alarm rotates, the rotor 9 is carried to a vertical position by the bumper 16 until it reaches a point past vertical whereupon the rotor falls by gravity against the bumper 17. However the button 14 prevents the clapper 11 from hitting the left side of the bell rotor 9 (Fig. 7) as a result of this fall. The bumper 17 has such a degree of resilience that the rotor 9 rebounds therefrom. As the speed of the spindle S increases, the number of times that the rotor 9 rebounds from the bumper 17 at each fall, decreases. It has been found that as the number of rebounds decreases with each fall, the free travel of the rotor and the thrust of the rotor 9 toward the bumper 16, caused by rebounding from bumper 17, increases. Due to the increase in the speed of the spindle S as the film thereon approaches termination, the rebounds from the bumper 17, as well as the free travel of the rotor and the thrust of the rotor toward the bumper 16, change continually until a point is reached where only one rebound occurs at each fall. This is the point of greatest rotor travel and the greatest thrust applied to the rotor whereupon the alarm sounds. At this time the clapper 11 mounted on the flat spring 12 inside of the tubular bell or rotor, is thrust against the right side thereof (Fig. 7) with such force that the alarm is sounded.

It should be noted that the results obtained are due directly to the rebound action between the falling rotor 9 and the rebound bumper 1.

While the present arrangement is particularly adapted for use with the upper magazine spindle of a motion picture projector, it is applicable to any mechanism wherein there is a horizontal shaft on which the alarm can be mounted to signal when the shaft rotates at a predetermined number of revolutions per minute. It will be noted that in the present alarm, no part thereof rides on the film. Also this arrangement needs no resetting after it is once adjusted to conditions of a given installation.

What I claim is:

1. In an alarm device for giving a warning when a predetermined speed of rotation of a horizontally mounted shaft is reached, said device comprising a frame plate rotatable in a vertical plane synchronously with said shaft, a stub shaft mounted on said plate to project horizontally therefrom, an elongated rotor pivotted on said stub shaft to swing thereon as said plate is rotated, spaced bumpers projecting from said plate in the path of said rotor to limit the arc of swing thereof, at least one of said bumpers being resilient to cause said rotor to rebound therefrom, and means supported within said rotor and cooperating therewith to give a signal.

2. In an alarm device for giving a warning when a predetermined speed of rotation of a horizontally mounted shaft is reached, said device comprising a frame plate having a hub projecting at right angles from the center of one surface thereof, said hub being adapted to be coupled to said shaft in alinement therewith, a bell shaft mounted on said plate to project at right angles therefrom, a bell having a clapper, said bell being pivotted on said bell shaft to swing thereon as said plate is rotated, spaced bumpers projecting from said plate in the path of said bell to limit the arc of swing thereof, at least one of said bumpers being resilient to cause the bell to rebound therefrom, and a mass of sound deadening material supported between the clapper and that side of the bell which hits said last mentioned bumper.

3. In an alarm device for warning of a given speed of rotation of a horizontally mounted shaft, said device comprising a frame plate having a hub projecting at right angles from the center of one surface thereof, said hub being adapted to be coupled to said shaft in alinement therewith, a bell shaft mounted eccentrically on the other surface of said plate to project at right angles therefrom, a tubular bell pivotted at one of its ends on said bell shaft to swing thereon as said plate is rotated, a clapper movably mounted within the bell in a position to strike the same, spaced bumpers projecting from said plate in the path of said bell to limit the arc of swing thereof, at least one of said bumpers being resilient to cause the bell to rebound therefrom, and a button of sound deadening material supported between the clapper and that side of the bell which hits said last mentioned bumper.

4. In an alarm device for giving a warning when a predetermined speed of rotation of a horizontally mounted shaft is reached, said device comprising a frame plate having a hub projecting at right angles from the center of one surface thereof, said hub being adapted to be coupled to said shaft in alinement therewith, a bell shaft mounted eccentrically on the other surface of said plate to project at right angles therefrom, a lengthwise slotted tubular bell pivotted at one of its ends on said bell shaft to swing thereon as said plate is rotated, a flexible spring fixed at one of its ends adjacent the pivotted end of said bell and having its other end extending to the other end of the bell, a clapper mounted on said other end of the spring in a position to strike said bell, spaced bumpers projecting from said plate in the path of said bell to limit the arc of swing thereof, at least one of said bumpers being resilient to cause the bell to rebound therefrom, and a button of sound deadening material supported between the clapper and that side of the bell which hits said last mentioned bumper.

MERRITT M. MITCHELL.

References Cited in the file of this patent
UNITED STATES PATENTS

| Number | Name | Date |
|---|---|---|
| 1,261,825 | Lewis | Apr. 9, 1918 |
| 1,678,402 | Magni | July 24, 1928 |
| 2,427,140 | Hatke | Sept. 9, 1947 |